United States Patent [19]
Bletz

[11] Patent Number: 4,887,062
[45] Date of Patent: Dec. 12, 1989

[54] THERMAL SENSOR ASSEMBLY

[75] Inventor: Howard W. Bletz, Worthington Twn., Richland County, Ohio

[73] Assignee: Hi-Stat Manufacturing Co., Inc., Sarasota, Fla.

[21] Appl. No.: 225,300

[22] Filed: Jul. 28, 1988

[51] Int. Cl.$^4$ .................. H01H 37/02; H01H 71/16
[52] U.S. Cl. ............................. 337/299; 337/3; 337/107
[58] Field of Search ............. 337/299, 102, 107, 2, 337/3

[56] References Cited

U.S. PATENT DOCUMENTS

| | | |
|---|---|---|
| 3,890,588 | 6/1975 | Kanaya et al. ............ 338/28 |
| 4,208,786 | 6/1980 | Merchant et al. .......... 338/14 |
| 4,223,293 | 9/1980 | Springer et al. ........... 324/65 P |
| 4,306,210 | 12/1981 | Saur ....................... 337/107 |

Primary Examiner—H. Broome
Attorney, Agent, or Firm—Lon H. Romanski

[57] ABSTRACT

A thermal sensor assembly is shown as having a housing formed of first and second body sections with the first being a probe-like portion for introduction into a medium the temperature of which is to be monitored; a thermistor and an electrical switch are electrically isolated from each other and situated within the housing; the thermistor is in series with and between one of the body sections and a terminal which is connectable to associated circuitry external of the sensor assembly; the electrical switch is effective to close an electrical circuit as between the same one of the body sections and a second terminal which is connectable to additional associated circuitry external of the sensor assembly.

38 Claims, 5 Drawing Sheets

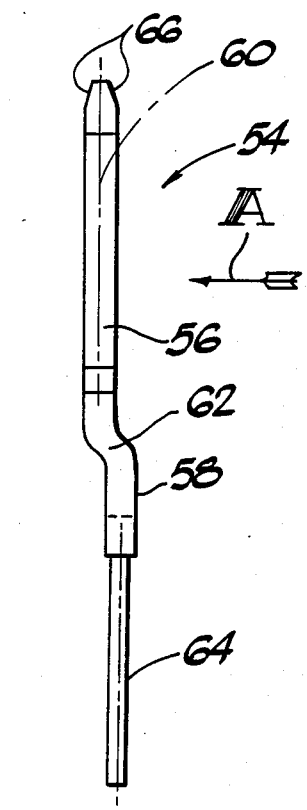
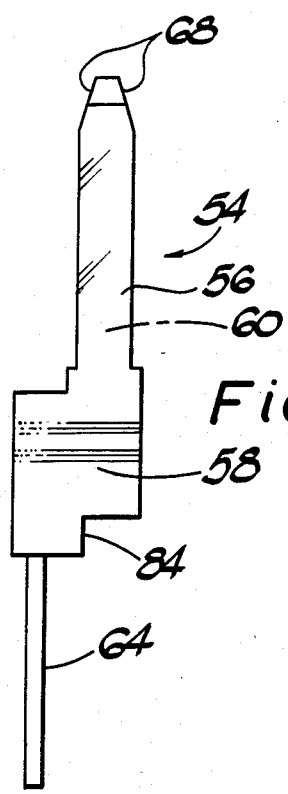
Fig 7
Fig 8
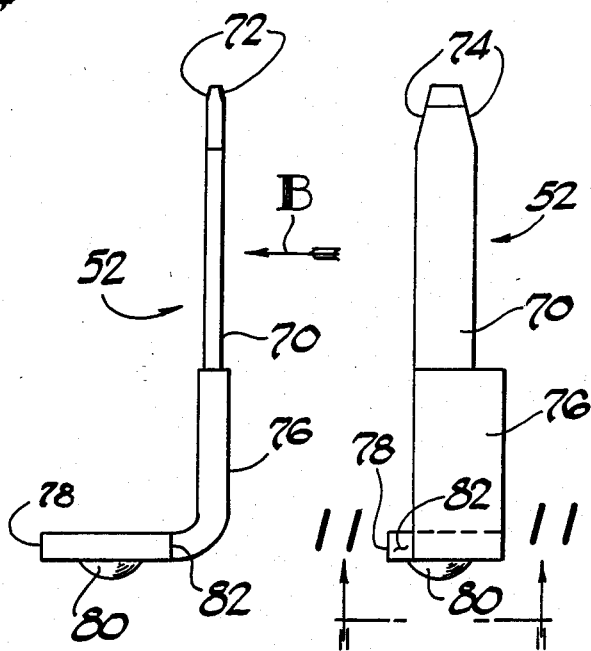
Fig 9
Fig 10
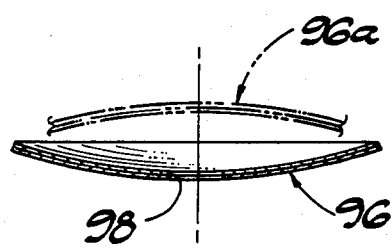
Fig 13
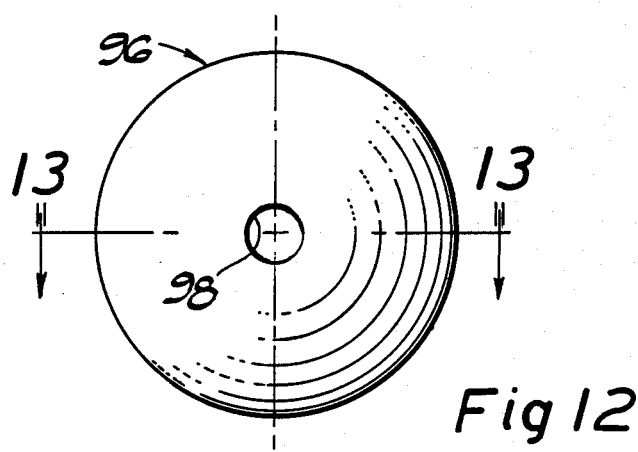
Fig 12
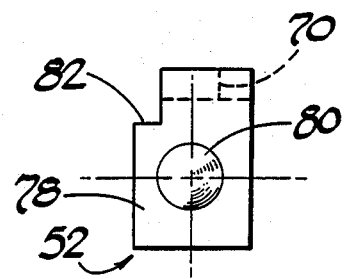
Fig 11

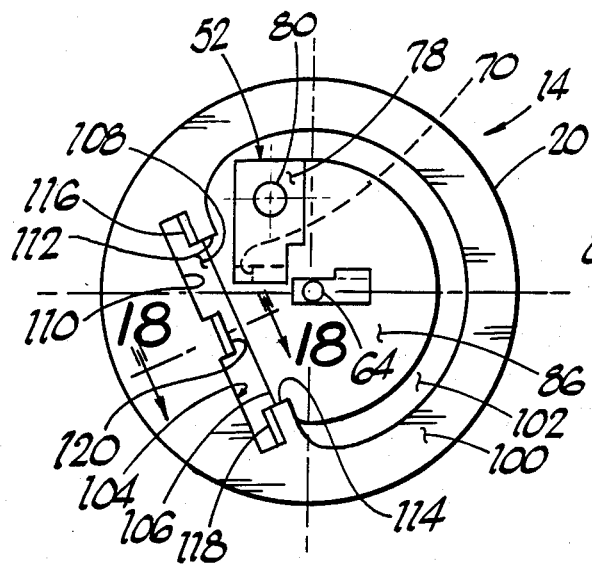
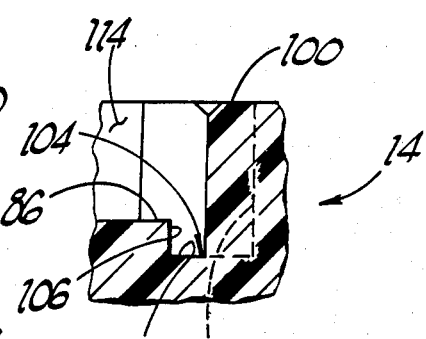
Fig 17
Fig 18
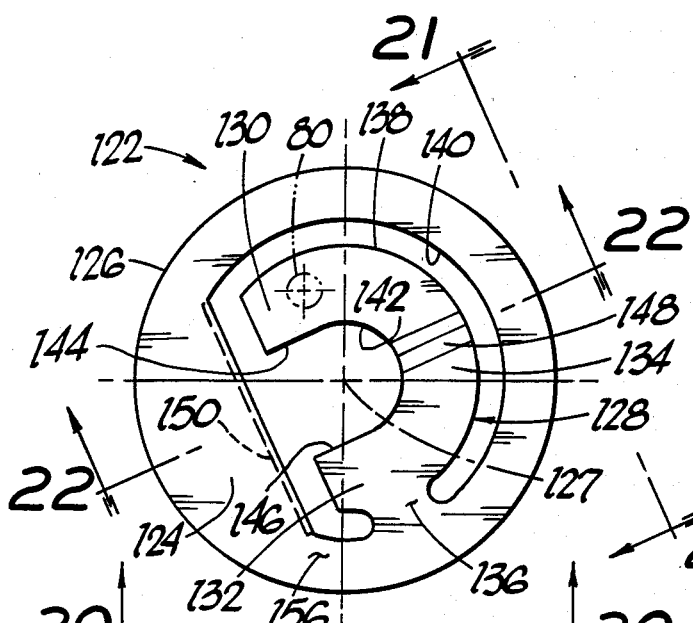
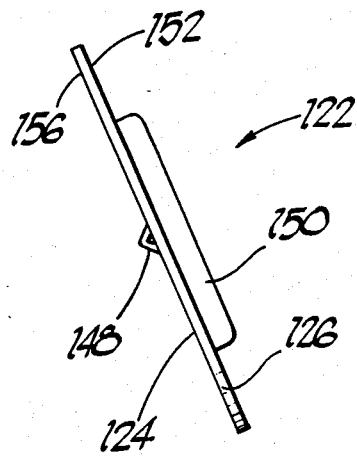
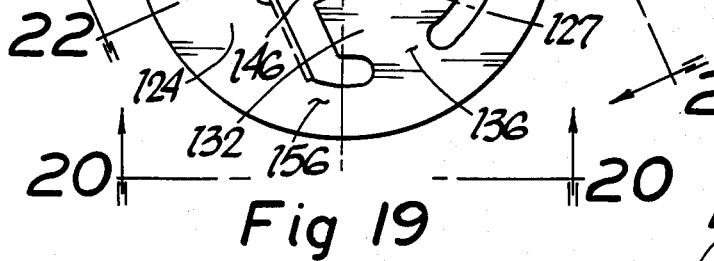
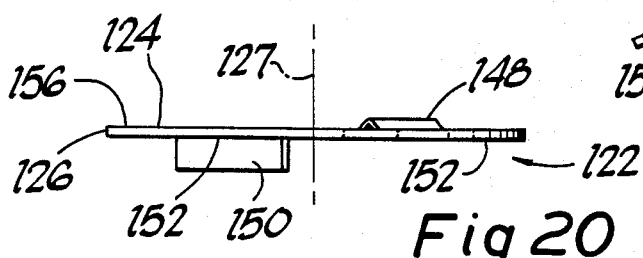
Fig 19
Fig 20
Fig 21
Fig 22

THERMAL SENSOR ASSEMBLY

FIELD OF THE INVENTION

This invention relates generally to assemblies for sensing the thermal condition of a monitored area or medium and more particularly to such assemblies which, in response to sensed thermal conditions are effective for producing an attendant electrical signal.

BACKGROUND OF THE INVENTION

Heretofore, thermal sensors have been generally well known in the art. Some of such prior art sensors are of the type which are effective for opening and/or closing related electrical circuits upon sensing a preselected temperature or temperatures. Other of such prior art sensors are of the type which are effective for producing varying electrical signals which are related to or indicative of the magnitude of the sensed temperature.

Further, such prior art sensors may be of the type which in and of themselves provide for electrical grounding or may be of the type which are in series circuit as between a source of electrical potential and an associated electrical load.

In the automotive industry, the relatively recent trend has been to produce automotive vehicles which are lighter in weight as to thereby reduce the rate of fuel consumption. As a consequence, the entire automotive vehicle as well as the vehicular engine have become physically smaller. The engines, even though smaller, usually have a significantly higher operating R.P.M. and require the monitoring of many operating parameters as well as indicia of engine operation for assuring, among other things, proper fuel metering to the engine, ignition timing and the prevention of engine damage due to, for example, loss of engine oil or oil pressure or excessive engine temperature. In effect, even though the present automotive engines are physically smaller and situated within vehicular engine compartments which provide little space for access to the engine, the various areas or points of monitoring have increased with the result that the number or quantity of sensor assemblies have also increased to the point where it has become difficult to find areas of the engine which can accommodate all of such necessary sensor assemblies.

In some instances a single indicium of engine operation may be employed as a signal for two or more separate and distinct functions. For example, engine operating temperature may be employed for modifying the rate of metered fuel flow (as during cold engine start-up and drive-away) and may be employed for actuation of sensory warning devices so that the vehicle operator is made aware of the engine approaching or attaining an over-temperature condition. In such example, as well as in others, the related electrical circuits leading as to the associated controls and/or warning devices are not compatible with each other. Therefore, in such situations the prior art has usually provided a separate sensor assembly and electrical circuit for each control and/or warning device. This has only aggravated the problem of finding sufficient space on the engine to accommodate all of such required sensor assemblies.

The invention as herein disclosed and described is primarily directed to the solution of the aforestated as well as other related and attendant problems.

SUMMARY OF THE INVENTION

According to one aspect of the invention, a thermal sensor assembly comprises housing means, said housing means comprising a first probe-like housing section and a second housing section, wherein said first housing section is intended for placement into a medium the temperature of which is to be monitored, a plurality of electrical terminal means carried by said second housing section for connection to associated electrical circuit means, thermistor means situated within said first housing section as to be responsive to the temperature of said monitored medium, electrical conductor means electrically interconnecting said thermistor means to a first of said plurality of electrical terminal means, and thermally responsive electrical switch means situated within said housing means, said thermally responsive electrical switch means being responsive to the temperature of said monitored medium and effective upon said monitored medium attaining a preselected magnitude of temperature for closing an electrical circuit through a second of said plurality of terminal means.

Various general and specific objects, advantages and aspects of the invention will become apparent when reference is made to the following detailed description considered in conjunction with the accompanying drawings.

BRIEF DESCRIPTION OF THE DRAWINGS

In the drawings, wherein for purposes of clarity certain details and/or elements ma be omitted from one or more views:

FIG. 7 is an elevational view of one of the terminal elements shown in FIG. 1;

FIG. 8 is a view taken generally in the direction of arrow A of FIG. 7;

FIG. 9 is an elevational view of another of the terminal elements shown in FIG. 1;

FIG. 10 is a view taken generally in the direction of arrow B of FIG. 9;

FIG. 11 is a view taken generally on the plane of line 11—11 of FIG. 10 and looking in the direction of the arrows;

FIG. 12 is a top plan view, in somewhat reduced scale, of another element shown in FIG. 1;

FIG. 13 is a cross-sectional view taken generally on the plane of line 13—13 of FIG. 12 and looking in the direction of the arrows;

FIG. 17 is a view taken generally on the plane of line 17—17 of FIG. 14 and looking in the direction of the arrows;

FIG. 18 is a cross-sectional view, in relatively enlarged scale, of a fragmentary portion of the structure of FIG. 17 taken generally on the plane of line 18—18 of FIG. 17 and looking in the direction of the arrows;

FIG. 19 is a view, in relatively reduced scale, of another of the elements in the structure of FIG. 1, taken generally on the plane of line 19—19 of FIG. 1 and looking in the direction of the arrows;

FIG. 20 is a view taken generally on the plane of line 20—20 of FIG. 19 and looking in the direction of the arrows;

FIG. 21 is a view taken generally on the plane of line 21—21 of FIG. 19 and looking in the direction of the arrows; and FIG. 22 is a cross-sectional view taken generally on the plane of line 22—22 of FIG. 19 and looking in the direction of the arrows.

DETAILED DESCRIPTION OF THE PREFERRED EMBODIMENT

Figure 1:
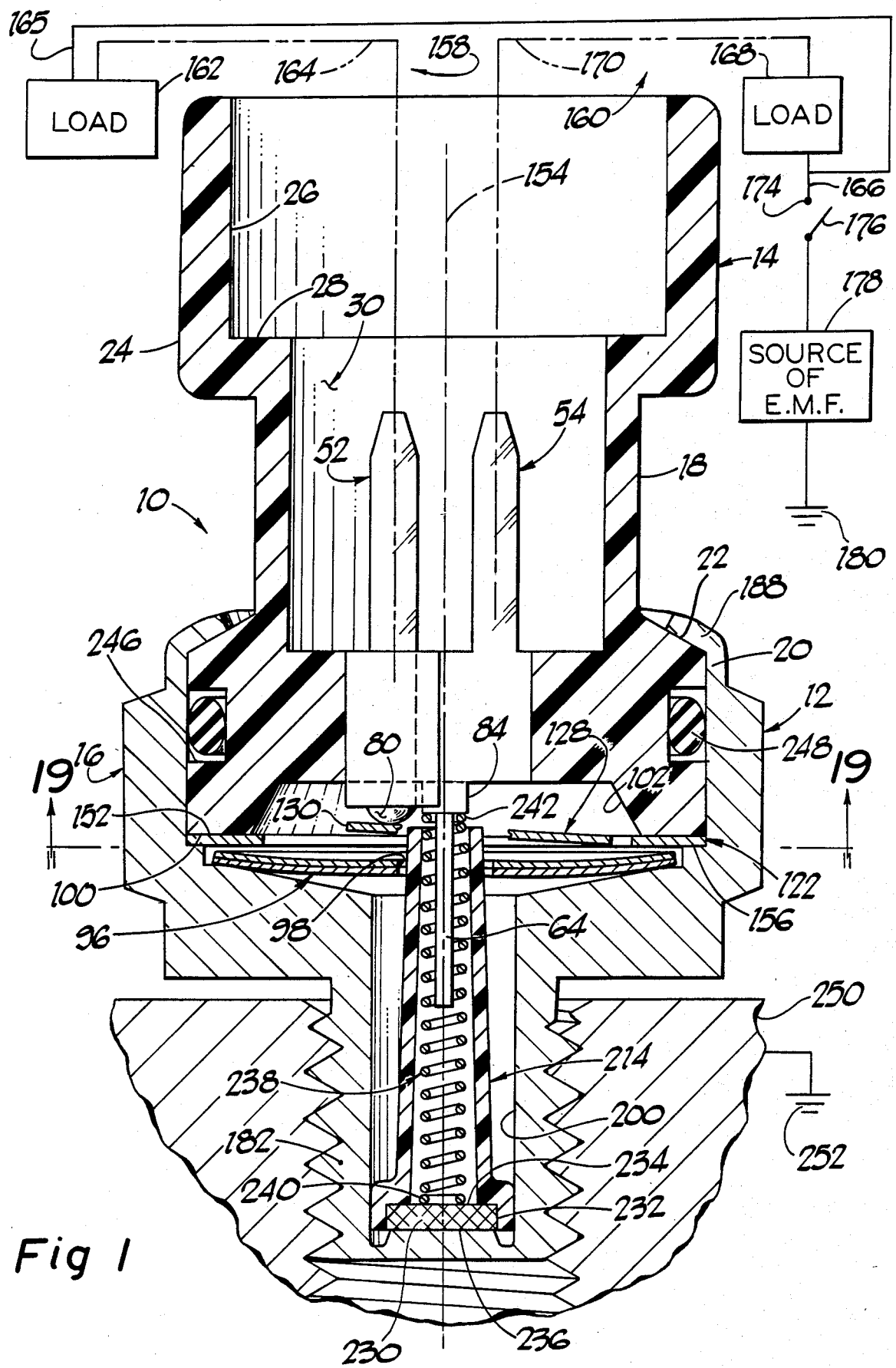
FIG. 1 is a generally axial cross-sectional view of a sensor assembly employing teachings of the invention along with schematically illustrated electrical circuitry associated therewith.

Referring now in greater detail to the drawings, FIG. 1 illustrates a sensor assembly 10 as comprising housing means 12, in turn, comprising an upper housing or body section or portion 14 and a lower housing section or portion 16. In the preferred embodiment upper body section 14 is comprised of suitable dielectric material and formed as to have integrally formed portions 18 and 20 with portion 20 being generally cylindrical and relatively larger as to provide for an annular shoulder or flange 22.

Figure 15:
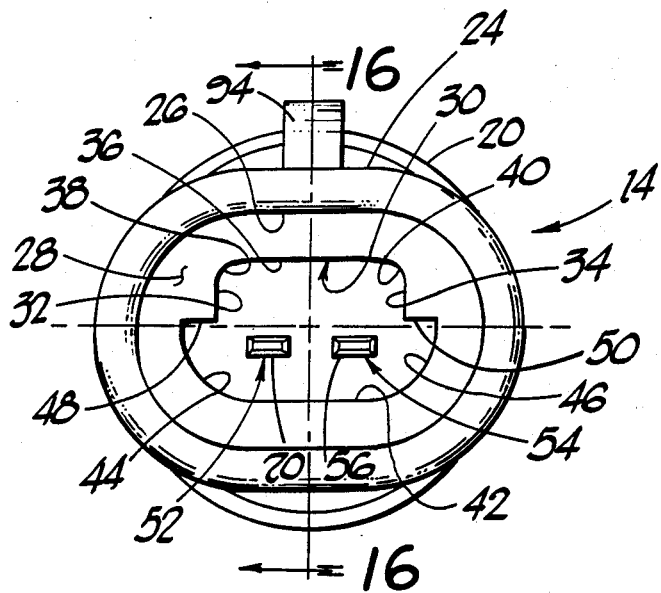
FIG. 15 is a view taken generally on the plane of line 15—15 of FIG. 14 and looking in the direction of the arrows.
Figure 14:
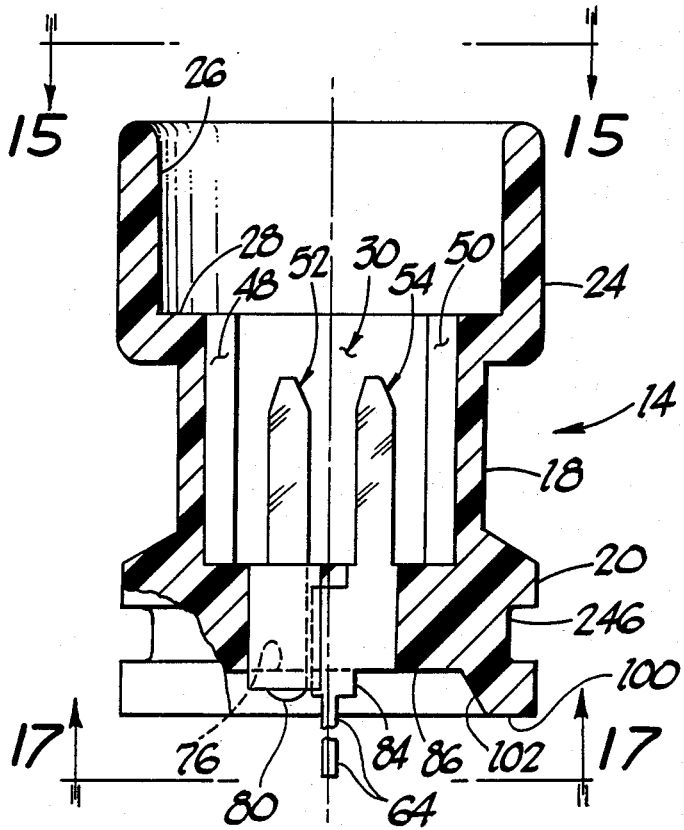
FIG. 14 is a view, in relatively reduced scale, of, in the main, only the generally upper portion of the sensor assembly of FIG. 1.

Referring in particular to FIGS. 1, 14, 15, 16 and 17, the upper housing or body section 14 is depicted as preferably comprising an upper (as viewed in FIGS. 1 and 14) portion 24 which may be larger than adjoining lower portion 18 and which is provided with a generally centrally situated axially extending bore or passage 26 terminating as at an inner flange or shoulder 28. A second or continued opening or passage 30 is formed further inwardly of passage 26 and is in general communication therewith. As best seen in FIGS. 14 and 15, the passage 30 is preferably configured as to be polarized and thereby receive a similarly shaped mating electrical plug (not shown) which carries socket like electrical contacts. More particularly, as best seen in FIGS. 14 and 15, the passage, opening or cavity 30 is depicted as comprising opposed generally flat walls 32 and 34, a third generally flat wall 36 with arcuate wall portions 38 and 40 which collectively span the distance between and effectively join respective one ends of walls 32 and 34. A wall 42 opposed to and spaced from wall 36 has arcuate end portions 44 and 46 which respectively join wall portions 48 and 50 with such, in turn, joining walls 32 and 34. The body section 14 is preferably molded and in the process of molding, electrical terminal members 52 and 54, which may be comprised of brass, are molded in and retained by body section 14.

Referring in greater detail to FIGS. 7 and 8, terminal 54 is depicted as comprising a main blade-like body 56 with a relatively enlarged lower portion 58 which, as seen in FIG. 8, is offset to the left with respect to the longitudinal axis 60 and, as seen in FIG. 7, is offset to the right of axis 60 as by a transitional portion 62. An extension or guide 64, which may be of cylindrical configuration, is preferably integrally formed with body portion 58 as to extend therefrom with its longitudinal axis generally parallel to axis 60. The upper end (as viewed in FIGS. 7 and 8) of terminal 54 may be tapered as at 66 and 68 to facilitate insertion thereof into a cooperating receiving contact of an associated electrical connector.

Referring in greater detail to FIGS. 9, 10 and 11, the terminal 52 is depicted as comprising a main blade-like body 70 which, at its upper end (as viewed in FIGS. 9 and 10), is preferably tapered as at 72 and 74 to facilitate insertion thereof into an associated electrical connector. As best seen in FIG. 10, the lower end of body 70 is formed with a generally enlarged offset body portion 76 which, in turn, is bent as to provide a laterally extending base-like body portion 78. The body portion 78 may be struck as to thereby form and provide a raised contact portion 80. The lateral body portion 78 may be notched-out as at 82 to provide for clearance with respect to terminal 54 when such are molded into the upper housing section 14.

As already indicated, when the upper body section 14 is formed terminals 52 and 54 are preferably, at that time, molded into body or housing section 14. As shown in FIGS. 1 and 14, terminal 54 is situated as to have the depending portion 84 thereof extending downwardly beyond transverse surface 86 of body section 14 while terminal 52 has its lateral or transverse portion 78 against the same surface 86. As best seen in FIG. 15, in the preferred embodiment the terminals 52 and 54 are so situated as to have their respective blade portions 70 an 56 offset from the axis 88 in the direction of wall 42.

Figure 16:
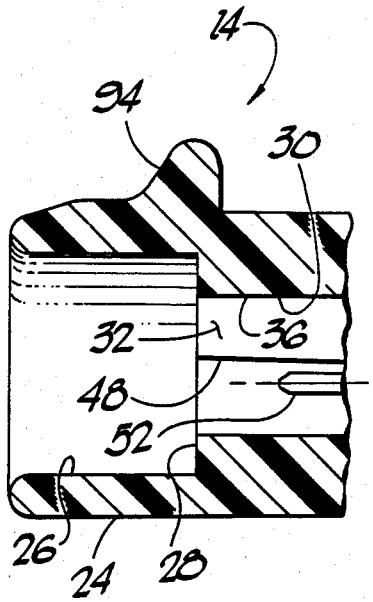
FIG. 16 is a fragmentary cross-sectional view taken generally on the plane of line 16—16 of FIG. 15 and looking in the direction of the arrows.

Referring in greater detail to FIGS. 15 and 16, the upper body or housing section 14 is preferably formed as to provide an integrally formed ear-like projection 94 which functions as a latching means for latchably securing an electrical connector assembly (not shown) which would be electrically connected to terminals 52 and 54 and possibly engage the inner and/or outer surfaces of upper portion 24 of housing section 14.

Referring to FIGS. 14, 17 and 18, the lower end (as viewed in FIG. 14) of housing section 14 is illustrated as comprising a generally annular end surface 100 and a generally inwardly formed inner transverse surface 86 which are effectively joined to each other as by an intermediate inclined transitional surface 102. A slot, groove or recess 104, formed further inwardly of body section 14 to a depth as at 108, effectively has one of its side walls 106 intersect with transverse wall or surface 86 as best seen in FIG. 18. The slot or recess 104 further comprises a wall 110 opposed to and spaced from wall 106.

Generally at opposite ends of the slot 104 are respective wall portions 112 and 114 extending somewhat toward each other. Wall portion 112 is provided with a side surface 116 projecting somewhat into slot 104 and towards wall 110; similarly, wall portion 114 is provided with a side surface 118 also projecting somewhat into slot 104 and towards wall 110. Further, generally midway between opposite ends of the slot 104, a projection has an end surface 120 projecting somewhat into slot 104 and towards wall 106.

FIGS. 19, 20, 21 and 22 illustrate a switching means 122 employable in the assembly 10 of FIG. 1. More particularly, in the preferred embodiment, the switch means 122 is comprised of beryllium copper alloy having a main body portion 124 of thin cross-sectional thickness and circular outer periphery 126 having an axis as at 127.

A generally resiliently deflectable switch arm 128 is formed generally centrally of the main body portion 124. In the preferred embodiment and as viewed in FIG. 19, the switch arm 128 is of a backward "C" configuration or a generally U-shaped configuration having leg-like portions 130 and 132 joined as by bight portion 134. The switch arm means 128 is resiliently connected to the main body portion 124 by its leg 132 through an interconnecting portion 136 integrally formed with leg 132 and body portion 124. The switch arm means 128 may have an outer generally circular portion 138 radially spaced as from a generally concentric inner circular portion 140 of body 124. Similarly, a generally central portion is cut away as to form a semi-circular inner portion or edge 142 with parallel inner side edges 144 and 146. Preferably, a structurally reinforcing indentation 148 is formed in and transversely of switch arm means 128.

When the switch arm means 128 is resiliently deflected in order to close the electrical circuit therethrough, the arm means 128 is deflected generally in the direction as depicted in phantom line in FIG. 22.

A tab-like or wall portion 150 is preferably struck from body portion 124 and formed as to be generally perpendicular to main body portion 124.

When the switch means 122 is assembled to housing means 14, as shown by FIGS. 14, 15, 16 and 17, the tab-like means or wall portion 150, serving as a keying or indexing means, is received in the slot or recess 104 (FIGS. 17 and 18) and is generally contained as between projecting portions 116 and 118, as at one side of the wall 150, and medially situated projecting portion 120 at the opposite side of the wall 150. At that time surface 152 of the main body portion 124 of the switch means 122 becomes seated against surface 100 of housing means 14 and contact 80 becomes located in juxtaposition to but spaced from leg 130 of switch arm means 128. Just for purposes of visual orientation such relative location of contact 80 is depicted in phantom line in FIG. 19.

FIGS. 12 and 13 illustrate a bimetal disc 96 with a clearance aperture or passage 98 formed therethrough. When the bimetal disc 96 is at a temperature below a preselected temperature, it may be considered to be in a configuration as generally illustrated in FIG. 13; however, when such disc 96 senses and attains the preselected temperature, it, in effect, snaps, as in a manner generally well known in the art, to an opposite dished configuration as fragmentarily illustrated in phantom line at 96a of FIG. 13.

Figure 3:
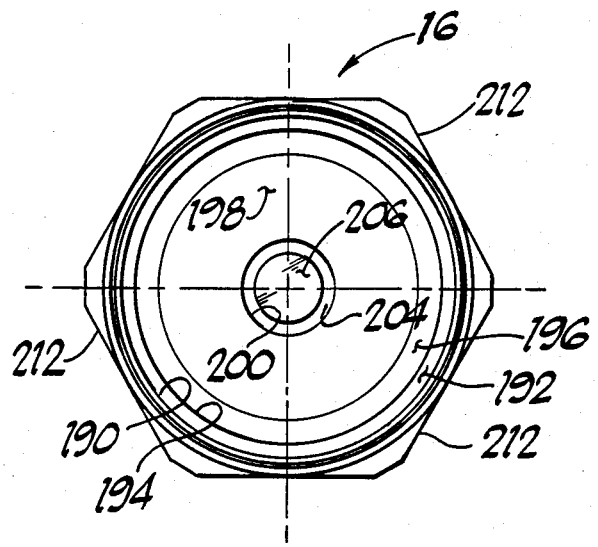
FIG. 3 is a view taken generally on the plane of line 3—3 of FIG. 2 and looking in the direction of the arrows.
Figure 2:
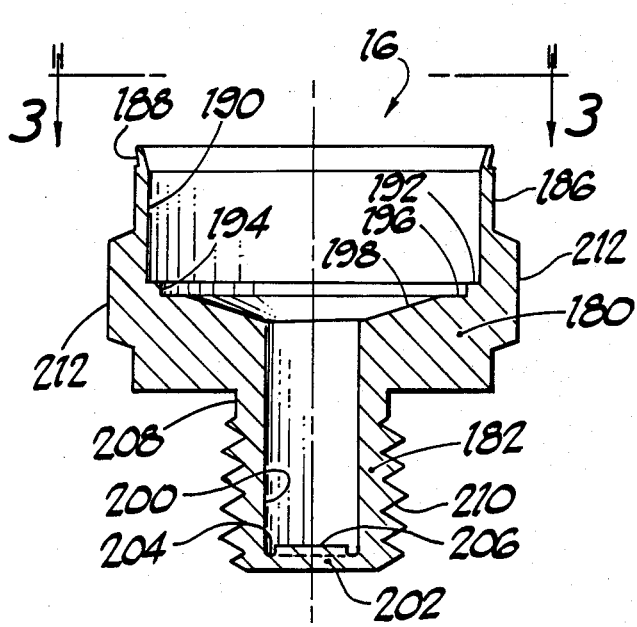
FIG. 2 is an axial cross-sectional view, in relatively reduced scale, of one of the elements shown in FIG. 1.

Referring in greater detail to FIGS. 2 and 3, the lower housing section 16, formed of any suitable electrically conductive material and preferably aluminum is illustrated as preferably comprising a relatively enlarged body portion 180 having an integrally formed axially extending generally cylindrical body extension portion 182. As best seen in FIG. 2, a relatively large cylindrical counterbore 190 is formed into the upper end of body portion 16 thereby defining an upwardly directed circular wall portion 186, with a further circular extension 188 upwardly directed therefrom, and an annular shoulder or flange-like surface 192.

A second counterbore 194, of a diameter less than that of counterbore 190, is formed further axially inwardly of body section 16 as to define a second annular shoulder or flange-like surface 196. Preferably, body portion 180 is further formed as with a generally conical space 198 which, in effect, leads from the inner periphery of annular shoulder 196 to an axially elongated cylindrical bore or passage 200 which is closed at its lower (as viewed in FIG. 2) end as by an integrally formed transverse wall 202.

In the preferred embodiment, the passage or bore 200 extends somewhat into end wall portion 202 as to define an annular groove 204 resulting in an inwardly directed cylindrical pilot-like portion 206 The outer surface 208 of extension 182 may be cylindrical with a portion thereof somewhat enlarged as to provide for a threaded portion 210. Further, the enlarged body portion 180 is provided with tool-engaging surface means 212 whereby threadable rotation of housing section 16 can be achieved.

Figure 6:
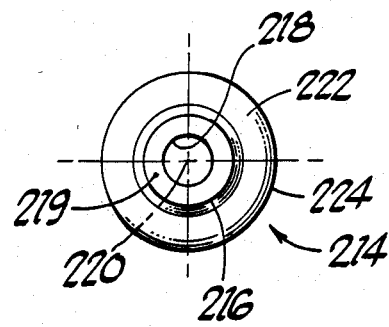
FIG. 6 is a view taken generally on the plane of line 6—6 of FIG. 4 and looking in the direction of the arrows.
Figure 4:
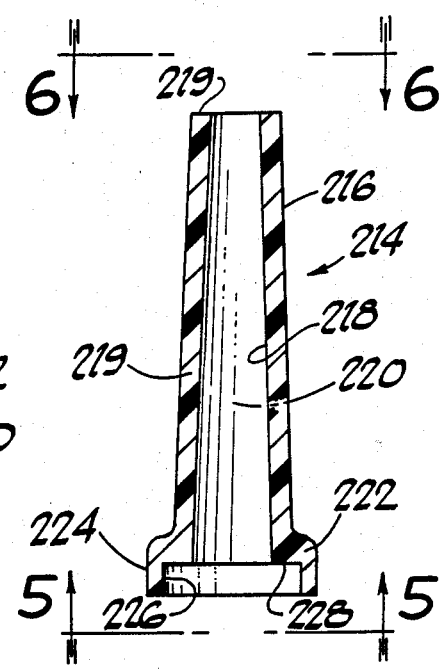
FIG. 4 is an axial cross-sectional view of another of the elements shown in FIG. 1.
Figure 5:
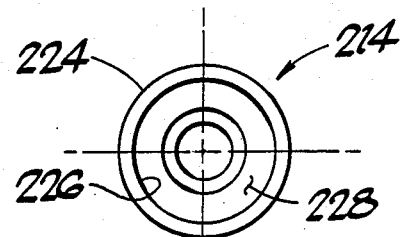
FIG. 5 is a view taken generally on the plane of line 5—5 of FIG. 4 and looking in the direction of the arrows.

Referring in greater detail to FIGS. 4, 5 and 6, an electrically insulating generally cylindrical tubular member 214 is preferably comprised of "Zytel". "Zytel" is a United States of America registered trademark of Du Pont de Nemours, E. I. & Co. of Wilmington, Del., for a nylon resin available as a molding powder. As best seen in FIG. 4, in the preferred embodiment, especially for molding purposes, the outer and inner surfaces 216 and 218, of the longitudinally extending wall 219 are somewhat tapered, with respect to axis 220, with the smaller diameters being as at the uppermost axial end.

The lower (as viewed in FIG. 4) portion of tubular member 214 is provided with a diametrical enlargement 222 which has an outer cylindrical surface 224 and a cylindrical counterbore 226 forming an annular shoulder 228.

Referring in greater detail to FIG. 1, it can be seen that when the various elements, as those of FIGS. 2-21, are assembled, the lower end 222, and more particularly the outer cylindrical surface 224 thereof, of electrically insulating tubular member 214 is closely received within bore 200 of lower housing section 16. A thermistor 230 is received generally within counterbore 226 of tubular member 214 as to be seated against the annular shoulder 228 thereof and seated against the axial end surface of portion 206 of housing section 16. In the embodiment disclosed, the thermistor 230 is of generally disc-like configuration having an outer cylindrical surface 232 and opposed axial end surfaces 234 and 236.

A coiled electrically conductive compression spring 238, also received within insulator tube 214 and extending generally along tube 214, has its lower (as viewed in FIG. 1) end 240 in electrically conductive engagement with thermistor 230 as by contacting surface 234 thereof. The length of spring 238 is such as to, in its free state, have its upper end 242 extending upwardly beyond the position depicted in FIG. 1.

The temperature responsive bimetal disk 96 is shown generally peripherally situated on the annular shoulder 196 of lower housing section 16 and in so doing the aperture or passage 98 of disk 96 permits the free extension therethrough of the tubular member 214.

The switch contact arm means 122 is shown as generally peripherally seated against annular shoulder 192 of lower housing section 16 and is firmly and securely held thereagainst as by the axial end surface 100 of upper body section 14. The upper body section 14 is preferably provided with a generally circumferential groove 246, as within body portion 20, which receives a suitable seal as an O-ring 248. The upper body or housing section 14, and O-ring 248, are closely received within counterbore 190 of lower housing section 16 and the upper extension 188 of wall 186 is spun-over against annular flange or shoulder 22 (as depicted in FIG. 1) thereby holding the various elements in an assembled condition. As should be apparent, when the hereinbefore elements are assembled into the assembly 10 of FIG. 1, the various respective axes thereof are placed into general axial alignment represented as by axis 154 of FIG. 1.

When the various elements are assembled, the tubular insulator means 214 passes through aperture 98 of bimetal 96 and preferably extends through the clearance as defined by sides 144, 146 and curvilinear juncture 142 of switch arm means 128 (best shown in FIG. 19). While switch means 122 has its surface 156 firmly seated against annular surface 192 of body or housing section 16, the dish-like thermostatic bimetal 96 is somewhat loosely contained between the main body portion 124, of switch means 122, and annular surface 196 of housing portion 16 (FIG. 2).

It should be mentioned that the view of the assembly 10 in FIG. 1 is not a true axial cross-sectional view since to have done so would have created a possible confusion of lines, etc. Therefore, for greater clarity and understanding, some of the elements of the overall assembly 10 have been rotated out of their actual locations and into the plane of the drawing while other elements have been partially broken away while still other elements have been shown in differing conditions of operation.

Operation of the Invention

The sensor assembly of the invention may, of course, be employed in any electrical environment; for purposes of illustration the sensor assembly is shown as operatively connected to circuit means 158 and 160. Circuit means 158 is illustrated as comprising electrical load means 162 having first conductor means 164 leading from load means 162 as to contact or terminal 52 and second conductor means 165 leading as to supply conductor means 166. Circuit means 160 is illustrated as comprising electrical load means 168 having conductor means 170 leading as to terminal or contact 54. Both loads 162 and 168 may be electrically connected to the common supply conductor 166 which, in turn, is depicted as having contact or terminal means 174 to be electrically opened and closed as by a switch means 176. The switch means 176 is, in turn, electrically connected to a suitable source of electromotive force 178 which is grounded as at 180. Another electrical path is illustrated as being established by lower housing section and associated structure 250 leading to electrical ground as at 252.

The sensor assembly 10 has the ability to sense the temperature of a monitored medium regardless of whether such monitored medium be fluid or solid. By way of example, the sensor assembly 10 is shown, in FIG. 1, as being threadably connected to a solid form of monitored medium as to be responsive to the temperature thereof. For purposes of illustration, structure 250 may be considered as a fragmentary portion of a vehicular engine as, for example, the engine block or cylinder head and the threaded passage therein could be a blind passage. Further, it may be assumed that switch means 176 is operated in relationship to the vehicle ignition switch means.

With the foregoing in mind, let it be assumed that the switch 176 is closed and the associated vehicular engine is operating. At this time it can be seen that a circuit is completed from source 178, switch 176, conductor means 166, load 168, conductor means 170, terminal means 54, terminal portion 84, spring 238, thermistor 230, extension 182 of housing section 16, structure 250 and back to ground as at 252. As should be apparent, the thermistor 230 is in series with the source 178 and load 168 and the resistance of thermistor 230, determined by the sensed temperature of the monitored medium 250, will determine the magnitude of the voltage across load 168.

The other completed circuit is from conductor means 166, conductor means 165, load 162, conductor means 164, terminal or contact means 52, contact 80 of terminal means 52, switch arm means 128 and main body portion 124 of switch means 122 to housing portion 16 which, through its connection with structure 250 is at ground potential.

As previously stated certain of the elements in FIG. 1 are depicted in differing operational conditions. This applies as to switch arm means 128 and the bimetal means 96 of FIG. 1. More particularly, the bimetal or snap disc means 96 of FIG. 1 is illustrated in a position or condition it would assume when sensing a monitored temperature less than a preselected magnitude while switch arm means 128 is depicted in a position (against contact 80) which it would assume when the snap disc means 96 did sense said preselected magnitude of monitored temperature.

In an under-temperature condition, the snap disc means 96 would be in a position or condition as generally depicted in FIG. 1 and switch arm means 128 would not be in engagement with contact 80 and may actually be in a generally flat planar configuration, with the main body portion 124 of switch means 122 as generally depicted in any of FIGS. 20, 21 or 22.

However, when snap disc means 96 senses the preselected magnitude of monitored temperature the disc means 96 effectively undergoes a snap-like movement to assume an oppositely configured dish-like configuration depicted in phantom line at 96a of FIG. 13. When this occurs, the snap disc 96, while in its snap-like movement, engages the switch arm means 128 and moves it upwardly (resiliently flexing about juncture 136, FIG. 19) causing switch means arm 130 to engage contact 80 and complete the previously described electrical circuit therethrough.

As should now be apparent, two separate circuits are actually formed within the sensor assembly 10 and such circuits are each responsive to the same monitored temperature and yet are capable of producing or providing differing outputs or control functions, in response to the same magnitude of sensed monitored temperature, as to be thereby effective for correspondingly effecting or modifying the operation of two operationally unrelated electrical loads.

It can be appreciated that the invention provides means whereby what, in the broad sense, would have required the prior art to employ at least two sensor assemblies can now be accomplished with a single sensor assembly thereby saving room, as for example, on a vehicular engine for the placement of other gauges, senders etc.

Another outstanding feature of the invention is that it can be made physically very small. For example, the bore 200 may have a diameter in the order of 0.190 inch, the outer diameter of the threaded portion 210 may be in the order of 0.375 inch (M 10×1.5 thread) and the snap disc 96, in its normal state, may have a diameter in the order of 0.625 inch. This indicates that the invention has the ability to be considered truly a miniature in the field of thermal sensor assemblies.

Prior art structures employing a movable or bendable electrical contact arm usually rivet or weld such contact arm to the associated electrically conductive support structure. In contrast, the switch contact arm 130 of the switch means 122 is carried by an integrally formed main body portion 124 and thereby eliminates the relatively costly procedure of mounting such a contact arm as by rivets or welding. Further, because no space is needed for rivets or welding the switch arm means 128 is of a longer effective length thereby enhancing its resilient movement and extending its operational life.

Further, it is not unusual, in the prior art, to have the snap disc carry at least a part of the switching current when the associated switch arm is closed by the snap disc. In the invention, the switch arm means 128 and, through the juncture 136, the entire switch means 122 effectively shunt the current to the housing section 16 thereby increasing the current carrying capacity of the switching means comprised of contact 80 and switch means 122.

Also, the invention provides for rapid dissipation of any internal heat generated by current flow along the switch means 122 since the outer circular area of the body portion 124, of switch means 122, is in intimate thermal and electrical contact with the metal of housing section 16 which serves as a heat sink.

Further, as should now be apparent, the sensor assembly 10 will operate properly in any plane or attitude.

Although only a preferred embodiment of the invention has been disclosed and described, it is apparent that other embodiments and modifications of the invention are possible within the scope of the appended claims.

What is claimed is:

1. A thermal sensor assembly, comprising housing means, said housing means comprising a first probe-like housing section having first and second housing ends and a second housing section having third and fourth housing ends, wherein said first and second housing sections are joined to each other as to have said first and fourth housing ends operatively connected to each other as to be juxtaposed to each other, wherein said first housing section is intended for placement into a medium the temperature of which is to be monitored in a manner whereby said second housing end is situated in said medium, a plurality of electrical terminal means carried by said housing means for connection to associated electrical circuit means, thermistor means situated within said first housing section at a location relatively remote to said first and fourth housing ends and relatively close to said second housing end as to be responsible to the temperature of said monitored medium, electrical conductor means electrically interconnecting said thermistor means to a first of said plurality of electrical terminal means, and thermally responsive electrical switch means situated within said housing means in an area between said thermistor means and said fourth housing end, said thermally responsive electrical switch means being responsive to the temperature of said monitored medium and effective upon said monitored medium attaining a preselected magnitude of temperature for closing an electrical circuit through a second of said plurality of terminal means.

2. A thermal sensor assembly according to claim 1 wherein said second housing section is comprised of dielectric material.

3. A thermal sensor assembly according to claim 1 wherein said first housing section comprises a longitudinally extending housing portion comprising a projecting end, wherein said second housing end comprises said projecting end, a longitudinally extending bore formed in said housing portion, an end wall carried by said housing portion and closing said projecting end of said longitudinally extending housing portion and said bore, wherein said thermistor means is situated in said bore as to be in electrically conductive relationship to said housing portion, and wherein said electrical conductor means comprises spring means electrically connected to said thermistor means and to said first electrical terminal means.

4. A thermal sensor assembly according to claim 3 wherein said spring means comprises a longitudinally extending coiled compression spring.

5. A thermal sensor assembly according to claim 3 wherein said thermistor means is in contact with said end wall thereby establishing said electrically conductive relationship to said housing portion.

6. A thermal sensor assembly, comprising housing means, said housing means comprising a first probe-like housing section and a second housing section, wherein said first housing section is intended for placement into a medium the temperature of which is to be monitored, a plurality of electrical terminal means carried by said housing means for connection to associated electrical circuit means, thermistor means situated within said first housing section as to be responsive to the temperature of said monitored medium, electrical conductor means electrically interconnecting said thermistor means to a first of said plurality of electrical terminal means, and thermally responsive electrical switch means situated within said housing means, said thermally responsive electrical switch means being responsive to the temperature of said monitored medium and effective upon said monitored medium attaining a preselected magnitude of temperature for closing an electrical circuit through a second of said plurality of terminal means, wherein said first housing section comprises a longitudinally extending housing portion, a longitudinally extending bore formed in said housing portion, an end wall carried by said housing portion and closing one end of said bore, wherein said thermistor means is situated in said bore as to be in electrically conductive relationship to said housing portion, and wherein said electrical conductor means comprises spring means electrically connected to said thermistor means and to said first electrical terminal means, wherein said thermistor means is in contact with said end wall thereby establishing said electrically conductive relationship to said housing portion, and further comprising tubular electrical insulator means situated within said bore, said insulator means generally circumscribing said thermistor means as to be generally between said thermistor means and the surface of said bore.

7. A thermal sensor assembly, comprising housing means, said housing means comprising a first probe-like housing section and a second housing section, wherein said first housing section is intended for placement into a medium the temperature of which is to be monitored, a plurality of electrical terminal means carried by said housing means for connection to associated electrical circuit means, thermistor means situated within said first housing section as to be responsive to the temperature of said monitored medium, electrical conductor means electrically interconnecting said thermistor means to a first of said plurality of electrical terminal means, and thermally responsive electrical switch means situated within said housing means, said thermally responsive electrical switch means being responsive to the temperature of said monitored medium and effective upon said monitored medium attaining a preselected magnitude of temperature for closing an electrical circuit through a second of said plurality of terminal means, wherein said first housing section comprises a longitudinally extending housing portion, a longitudinally extending bore formed in said housing portion, an end wall carried by said housing portion and closing one end of said bore, wherein said thermistor means is situated in said bore as to be in electrically conductive relationship to said housing portion, and wherein said electrical conductor means comprises spring means electrically connected to said thermistor means and to said first electrical terminal means, wherein said spring means comprises a longitudinally extending coiled compression spring, and further comprising longitudinally extending tubular electrical insulator means situated within said bore, said insulator means generally circumscribing said coiled compression spring as to be between said coiled compression spring and the surface comprising said bore.

8. A thermal sensor assembly according to claim 1 wherein said electrical switch means comprises thermally responsive bimetallic means.

9. A thermal sensor assembly according to claim 1 wherein said electrical switch means comprises electrical contact means and thermally responsive bimetallic means for moving said contact means, and wherein when said electrical circuit through said second terminal means is closed said contact means is in engagement with said second terminal means.

10. A thermal sensor assembly, comprising housing means, said housing means comprising a first probe-like housing section and a second housing section, wherein said first housing section is intended for placement into a medium the temperature of which is to be monitored, a plurality of electrical terminal means carried by said housing means for connection to associated electrical circuit means, thermistor means situated within said first housing section as to be responsive to the temperature of said monitored medium, electrical conductor means electrically interconnecting said thermistor means to a first of said plurality of electrical terminal means, and thermally responsive electrical switch means situated within said housing means, said thermally responsive electrical switch means being responsive to the temperature of said monitored medium and effective upon said monitored medium attaining a preselected magnitude of temperature for closing an electrical circuit through a second of said plurality of terminal means, wherein said first housing section comprises a longitudinally extending housing portion, a longitudinally extending bore formed in said housing portion, an end wall carried by said housing portion and closing one end of said bore, wherein said thermistor means is situated in said bore as to be in electrically conductive relationship to said housing portion, and wherein said electrical conductor means comprises spring means electrically connected to said thermistor means and to said first electrical terminal means, wherein said spring means comprises a longitudinally extending coiled compression spring, wherein said electrical switch means comprises electrical contact means and thermally responsive bimetallic means for moving said contact means, wherein when said electrical circuit through said second terminal means is closed said contact means is in engagement with said second terminal means, wherein said thermally responsive bimetallic means comprises a bimetallic snap disc having at least first and second positions of stability, a clearance aperture formed through said snap disc, wherein a portion of said coiled compression spring extends through said clearance aperture, wherein said contact means comprises a resiliently deflectable contact arm, wherein said snap disc is in said first position of stability prior to sensing that said monitored medium has attained said preselected magnitude to temperature, wherein said snap disc is in said second position of stability upon sensing that said monitored medium has attained said preselected magnitude of temperature, and wherein when said snap disc is in said second position of stability said snap disc holds said contact arm in engagement with said second terminal means.

11. A thermal sensor assembly according to claim 10 and further comprising electrical insulator means, said electrical insulator means being situated generally between said coiled compression spring and said snap disc as to prevent said coiled compression spring from contacting the portion of said snap disc defining said clearance aperture.

12. A thermal sensor assembly according to claim 11 wherein said electrical insulator means is of generally tubular configuration and physically separate from said coiled compression spring and said snap disc.

13. A thermal sensor assembly according to claim 12 wherein said electrical insulator means is pilotingly engaged in and by said bore.

14. A thermal sensor assembly according to claim 10 wherein said resiliently deflectable contact arm is deflectably secured at a first end and has a second free end opposite to said first end which is deflectably swingable, wherein said contact arm is provided with a clearance portion formed therein generally between said first and second ends, and wherein said coiled compression spring extends through said clearance portion of said contact arm.

15. A thermal sensor assembly according to claim 14 and further comprising electrical insulator means, said electrical insulator means being situated generally between said coiled compression spring and said contact arm as to prevent said coiled compression spring from contacting the portion of said contact arm defining said clearance portion of said contact arm.

16. A thermal sensor assembly according to claim 15 wherein said electrical insulator means is of generally tubular configuration and physically separate from said coiled compression spring and said contact arm.

17. A thermal sensor assembly according to claim 16 wherein said electrical insulator means is pilotingly engaged in and by said bore.

18. A thermal sensor assembly, comprising housing means, said housing means comprising a first probe-like housing section and a second housing section, wherein said first housing section is intended for placement in to a medium the temperature of which is to be monitored, a plurality of electrical terminal means carried by said housing means for connection to associated electrical circuit means, thermistor means situated within said first housing section as to be responsive to the temperature of said monitored medium, electrical conductor means electrically interconnecting said thermistor means to a first of said plurality of electrical terminal means, and thermally responsive electrical switch means situated within said housing means, said thermally responsive electrical switch means being responsive to the temperature of said monitored medium and effective upon said monitored medium attaining a preselected magnitude of temperature for closing an electrical circuit through a second of said plurality of terminal means, wherein said first housing section comprises a longitudinally extending housing portion, a longitudinally extending bore formed in said housing portion, an end wall carried by said housing portion and closing one end of said bore, wherein said thermistor means is situated in said bore as to be in electrically conductive relationship to said housing portion, and wherein said electrical conductor means comprises spring means electrically connected to said thermistor means and to said first electrical terminal means, wherein said spring means comprises a longitudinally extending coiled compression spring, wherein said electrical switch means comprises electrical contact means and thermally responsive bimetallic means for moving said contact means, wherein when said electrical circuit through said second terminal means is closed said contact means is in engagement with said second terminal means, wherein said thermally responsive bimetallic means comprises a bimetallic snap disc having at least first and second positions of stability, a clearance aperture formed through said snap disc, wherein a portion of said first electrical terminal means extends through said clearance aperture, wherein said contact means comprises a resiliently deflectable contact arm, wherein said snap disc is in said first position of stability prior to sensing that said monitored medium has attained said preselected magnitude of temperature, wherein said snap disc is in said second position of stability upon sensing that said monitored medium has attained said preselected magnitude of temperature, and wherein when said snap disc is in said second position of stability said snap disc holds said contact arm in engagement with said second terminal means.

19. A thermal sensor assembly according to claim 18 and further comprising electrical insulator means, said electrical insulator means being situated generally between said portion of said first terminal means and said snap disc as to prevent said portion of said first terminal means from contacting the portion of said snap disc defining said clearance aperture.

20. A thermal sensor assembly according to claim 19 wherein said electrical insulator means is of generally tubular configuration and physically separate from said first terminal means and said snap disc.

21. A thermal sensor assembly according to claim 20 wherein said electrical insulator means is pilotingly engaged in and by said bore.

22. A thermal sensor assembly according to claim 18 wherein said resiliently deflectable contact arm is deflectably secured at a first end and has a second free end opposite to said first end which is deflectably swingable, wherein said contact arm is provided with a clearance portion formed therein generally between said first and second ends, and wherein said portion of said first terminal means extends through said clearance portion of said contact arm.

23. A thermal sensor assembly according to claim 22 and further comprising electrical insulator means, said electrical insulator means being situated generally between said portion of said first terminal means and said contact arm as to prevent said portion of said first terminal means from contacting the portion of said contact arm defining said clearance portion of said contact arm.

24. A thermal sensor assembly according to claim 23 wherein said electrical insulator means is of generally tubular configuration and physically separate from said portion of said first terminal means and said contact arm.

25. A thermal sensor assembly according to claim 24 wherein said electrical insulator means is pilotingly engaged in and by said bore.

26. A thermal sensor assembly, comprising housing means, said housing means comprising a first probe-like housing section and a second housing section, wherein said first housing section is intended for placement into a medium the temperature of which is to be monitored, a plurality of electrical terminal means carried by said housing means for connection to associated electrical circuit means, thermistor means situated within said first housing section as to be responsive to the temperature of said monitored medium, electrical conductor means electrically interconnecting said thermistor means to a first of said plurality of electrical terminal means, and thermally responsive electrical switch means situated within said housing means, said thermally responsive electrical switch means being responsive to the temperature of said monitored medium and effective upon said monitored medium attaining a preselected magnitude of temperature for closing an electrical circuit through a second of said plurality of terminal means, wherein said first housing section comprises a longitudinally extending housing portion, a longitudinally extending bore formed in said housing portion, an end wall carried by said housing portion and closing one end of said bore, wherein said thermistor means is situated in said bore as to be in electrically conductive relationship to said housing portion, and wherein said electrical conductor means comprises spring means electrically connected to said thermistor means and to said first electrical terminal means, wherein said spring means comprises a longitudinally extending coiled compression spring, wherein said electrical switch means comprises electrical contact means and thermally responsive bimetallic means for moving said contact means, wherein when said electrical circuit through said second terminal means is closed said contact means is in engagement with said second terminal means, wherein said thermally responsive bimetallic means comprises a bimetallic snap disc having at least first and second positions of stability, a clearance aperture formed through said snap disc, wherein a portion of said first terminal means extends through said clearance aperture, wherein said contact means comprises a resiliently deflectable contact arm, wherein said snap disc is in said first position of stability prior to sensing that said monitored medium has attained said preselected magnitude of temperature, wherein said snap disc is in said second position of stability upon sensing that said monitored medium has attained said preselected magnitude of temperature, wherein when said snap disc is in said second position of stability said snap disc holds said contact arm in engagement with said second terminal means, and wherein said portion of said first terminal means serves as pilot means for said coiled compression spring as to thereby prevent said coiled compression spring from moving into contact with said snap disc.

27. A thermal sensor assembly according to claim 26 and further comprising electrical insulator means, said electrical insulator means being situated generally between said coiled compression spring and said snap disc as to prevent said coiled compression spring from being contacted by the portion of said snap disc defining said clearance aperture.

28. A thermal sensor assembly according to claim 27 wherein said electrical insulator means is of generally tubular configuration and physically separate from said coiled compression spring said snap disc and said portion of said first terminal means 29. A thermal sensor assembly according to claim 28 wherein said electrical insulator means is pilotingly engaged in and by said bore.

30. A thermal sensor assembly according to claim 26 wherein said resiliently deflectable contact arm is deflectably secured at a first end and has a second free end opposite to said first end which is deflectably swingable, wherein said contact arm is provided with a clearance portion formed therein generally between said first and second ends, and wherein said portion of said first terminal means extends through said clearance portion of said contact arm.

31. A thermal sensor assembly, comprising housing means, said housing means comprising a first probe-like housing section and a second housing section, wherein said first housing section is intended for placement into a medium the temperature of which is to be monitored, a plurality of electrical terminal means carried by said housing means for connection to associated electrical circuit means, thermistor means situated within said first housing section as to be responsive to the temperature of said monitored medium, electrical conductor means electrically interconnecting said thermistor means to a first of said plurality of electrical terminal means, and thermally responsive electrical switch means situated within said housing means, said thermally responsive electrical switch means being responsive to the temperature of said monitored medium and effective upon said monitored medium attaining a preselected magnitude of temperature for closing an electrical circuit through a second of said plurality of terminal means, wherein said first housing section comprises a longitudinally extending housing portion, a longitudinally extending bore former in said housing portion, an end wall carried by said housing portion and closing one end of said bore, wherein said thermistor means is situated in said bore as to be in electrically conductive relationship to said housing portion, and wherein said electrical conductor means comprises spring means electrically connected to said thermistor means and to said first electrical terminal means, wherein said spring means comprises a longitudinally extending coiled compression spring, wherein said electrical switch means comprises electrical contact means and thermally responsive bimetallic means for moving said contact means, wherein when said electrical circuit through said second terminal means is closed said contact means is in engagement with said second terminal means, wherein said thermally responsive bimetallic means comprises a bimetallic snap disc having at least first and second positions of stability, a clearance aperture formed through said snap disc, wherein a portion of said first terminal means extends through said clearance aperture, wherein said contact means comprises a resiliently deflectable contact arm, wherein said snap disc is in said first position of stability prior to sensing that said monitored medium has attained said preselected magnitude of temperature, wherein said snap disc is in said second position of stability upon sensing that said monitored medium has attained said preselected magnitude of temperature, wherein when said snap disc is in said second position of stability said snap disc holds said contact arm in engagement with said second terminal means, wherein said resiliently deflectable contact arm is deflectably secured at a first end and has a second free end opposite to said first end which is deflectably swingable, wherein said contact arm is provided with a clearance portion formed therein generally between said first and second ends, wherein said portion of said first terminal means extends through said clearance portion of said contact arm, and wherein said portion of said first terminal means extends into said bore as to operatively contain said coiled compression spring from contacting the surface defining said bore.

32. A thermal sensor assembly, comprising housing means, said housing means comprising a first probe-like housing section and a second housing section, wherein said first housing section is intended for placement into a medium the temperature of which is to be monitored, a plurality of electrical terminal means carried by said housing means for connection to associated electrical circuit mean, thermistor means situated within said first housing section as to be responsive to the temperature of said monitored medium, electrical conductor means electrically interconnecting said thermistor means to a first of said plurality of electrical terminal means, and thermally responsive electrical switch means situated within said housing means, said thermally responsive electrical switch means being responsive to the temperature of said monitored medium and effective upon said monitored medium attaining a preselected magnitude of temperature for closing an electrical circuit through a second of said plurality of terminal means, wherein said electrical switch means comprises electrical contact means and thermally responsive bimetallic means for moving said contact means, wherein when said electrical circuit through said second terminal means is closed said contact means is in engagement with said second terminal means, wherein said thermally responsive bimetallic means comprises a bimetallic snap disc having at least first and second positions of stability, a clearance aperture formed through said snap disc, wherein a portion of said electrical conductor means extends through said clearance aperture, wherein said contact means comprises a resiliently deflectable contact arm, wherein said snap disc is in said first position of stability prior to sensing that said monitored medium has attained said preselected magnitude of temperature, wherein said snap disc is in said second position of stability upon sensing that said monitored medium has attained said preselected magnitude of temperature, and wherein when said snap disc is in said second position of stability said snap disc holds said contact arm in engagement with said second terminal means.

33. A thermal sensor assembly, comprising housing means, said housing means comprising a first probe-like housing section and a second housing section, wherein said first housing section is intended for placement into a medium the temperature of which is to be monitored, a plurality of electrical terminal means carried by said housing means for connection to associated electrical circuit means, thermistor means situated within said first housing section as to be responsive to the temperature of said monitored medium, electrical conductor means electrically interconnecting said thermistor means to a first of said plurality of electrical terminal means, and thermally responsive electrical switch means situated within said housing means, said thermally responsive electrical switch means being responsive to the temperature of said monitored medium and effective upon said monitored medium attaining a preselected magnitude of temperature for closing an electrical circuit through a second of said plurality of terminal means, wherein said electrical switch means comprises electrical contact means and thermally responsive bimetallic means for moving said contact means, wherein said electrical circuit through said second terminal means is closed said contact means is in engagement with said second terminal means, wherein said thermally responsive bimetallic means comprises a metallic snap disc having at least first and second positions of stability, a clearance aperture formed through said snap disc, wherein a portion of said first electrical terminal means extends through said clearance aperture, wherein said contact means comprises a resiliently deflectable contact arm, wherein said snap disc is in said first position of stability prior to sensing that said monitored medium has attained said preselected magnitude of temperature, wherein said snap disc is in said second position of stability upon sensing that said monitored medium has attained said preselected magnitude of temperature, and wherein when said snap disc is in said second position of stability said snap disc holds said contact arm in engagement with said second terminal means.

34. A thermal sensor assembly, comprising housing means, stationary electrical contact means carried by said housing means, movable electrical contact means carried by said housing means and effective to at times engage said stationary electrical contact means, and thermally responsive means for at times causing said movable electrical contact means to be in engagement with said stationary electrical contact means, wherein said movable electrical contact means comprises a generally peripheral body portion fixedly carried by said housing means against relative motion therebetween, wherein said movable electrical contact means comprises a movable contact arm carried by said generally peripheral body portion, wherein said movable contact arm is resiliently deflectable relative to said generally peripheral body portion, wherein said movable contact arm is disposed generally inwardly of said generally peripheral body portion, and wherein said engagement with said stationary electrical contact means is achieved by said movable contact arm.

35. A thermal sensor assembly according to claim 34 wherein said generally peripheral body portion is of an annular configuration having a generally centrally disposed opening therein, and wherein said movable contact arm extends as to be within the projected area of said centrally disposed opening.

36. A thermal sensor assembly according to claim 35 wherein said movable contact arm is of a generally U-shaped configuration having one leg of said generally U-shaped configuration integrally attached to said generally peripheral body portion and having a second leg of said generally U-shaped configuration deflectably swingable.

37. A thermal sensor assembly according to claim 36 wherein said thermally responsive means comprises a bimetallic member operatively engageable with said movable contact arm to at times cause resilient deflection thereof.

38. A thermal sensor assembly according to claim 37 wherein said bimetallic member comprises a bimetallic snap disc.

* * * * *

UNITED STATES PATENT AND TRADEMARK OFFICE
CERTIFICATE OF CORRECTION

PATENT NO. : 4,887,062
DATED : December 12, 1989
INVENTOR(S) : Howard W. Bletz

It is certified that error appears in the above-identified patent and that said Letters Patent is hereby corrected as shown below:

Column 9, lines 62 and 63 (Claim 1, lines 17 and 18), change "responsible" to --- responsive ---.

Column 12, line 22 (Claim 10, line 46) after "magnitude" substitute --- of --- for "to".

Column 15, line 52 (Claim 31, line 22) change "former" to --- formed ---.

Column 17, line 22 (Claim 33, line 26) change "metallic" to --- bimetallic ---.

Signed and Sealed this

Eighteenth Day of September, 1990

Attest:

HARRY F. MANBECK, JR.

*Attesting Officer*  *Commissioner of Patents and Trademarks*